United States Patent
Zhong et al.

(10) Patent No.: US 12,152,634 B2
(45) Date of Patent: Nov. 26, 2024

(54) RADIAL STATOR, MAGNETIC LEVITATION BEARING, INSTALLATION METHOD, AND MOTOR

(71) Applicant: GREE ELECTRIC APPLIANCES, INC. OF ZHUHAI, Zhuhai (CN)

(72) Inventors: Dunying Zhong, Zhuhai (CN); Gao Gong, Zhuhai (CN); Xin Li, Zhuhai (CN); Mingxing Deng, Zhuhai (CN); Jianhui Wang, Zhuhai (CN); Jiajia Liu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 71 days.

(21) Appl. No.: 18/001,854

(22) PCT Filed: May 11, 2021

(86) PCT No.: PCT/CN2021/093051
§ 371 (c)(1),
(2) Date: Dec. 14, 2022

(87) PCT Pub. No.: WO2022/041842
PCT Pub. Date: Mar. 3, 2022

(65) Prior Publication Data
US 2023/0235784 A1 Jul. 27, 2023

(30) Foreign Application Priority Data
Aug. 26, 2020 (CN) .......................... 202010876118.6

(51) Int. Cl.
*F16C 32/04* (2006.01)
*H02K 7/09* (2006.01)

(52) U.S. Cl.
CPC ........... *F16C 32/0474* (2013.01); *H02K 7/09* (2013.01)

(58) Field of Classification Search
CPC .............. F16C 32/0474; F16C 32/0442; F16C 32/0463; F16C 32/0461; F16C 2380/26;
(Continued)

(56) References Cited

U.S. PATENT DOCUMENTS

| | | | |
|---|---|---|---|
| 2,517,105 A | * | 8/1950 | Greer ....................... H02K 3/18 |
| | | | 310/194 |
| 3,184,271 A | * | 5/1965 | Gilinson, Jr. ....... F16C 32/0444 |
| | | | 310/90.5 |

(Continued)

FOREIGN PATENT DOCUMENTS

| | | |
|---|---|---|
| CN | 101943128 A | 1/2011 |
| CN | 106208430 A | 12/2016 |

(Continued)

OTHER PUBLICATIONS

International Search Report mailed Aug. 13, 2021, issued in corresponding International Application No. PCT/CN2021/093051, filed May 11, 2021, 2 pages.

(Continued)

*Primary Examiner* — Ahmed Elnakib
(74) *Attorney, Agent, or Firm* — Christensen O'Connor Johnson Kindness PLLC

(57) ABSTRACT

A radial stator includes a stator core, and the stator core includes a stator outer ring. M magnetic poles are arranged on an inner circumferential wall of the stator outer ring, and are evenly distributed along the inner circumferential wall of the stator outer ring. The M magnetic poles include $M_1$ magnetic poles arranged along the inner circumferential wall of the stator outer ring and $M_2$ magnetic poles arranged along the inner circumferential wall of the stator outer ring; $M \geq 2$, $M_1 \geq 1$, and $M_2 \leq 1$; the $M_1$ magnetic poles and the $M_2$ magnetic poles are arranged on two sides of the stator outer ring with respect to a radial direction thereof, respectively; each of the $M_1$ magnetic poles is provided with a first (Continued)

winding; and each of the $M_2$ magnetic poles is provided with a second winding; and a coil turn $N_1$ of the first winding is greater or less than a coil turn $N_2$ of the second winding.

8 Claims, 3 Drawing Sheets

(58) Field of Classification Search
CPC .......... F16C 32/048; H02K 7/09; H02K 3/18; H02K 1/14; H02K 1/185; H02K 15/022; H02K 2213/03
USPC ........................................................ 310/90.5
See application file for complete search history.

(56) References Cited

U.S. PATENT DOCUMENTS

| | | | |
|---|---|---|---|
| 8,508,097 B2 * | 8/2013 | Okamoto | H02K 15/00 310/273 |
| 2007/0216244 A1 | 9/2007 | Edelson | |
| 2023/0235784 A1 * | 7/2023 | Zhong | H02K 7/09 310/90.5 |

FOREIGN PATENT DOCUMENTS

| | | | |
|---|---|---|---|
| CN | 106981940 | A | 7/2017 |
| CN | 108306552 | A | 7/2018 |
| CN | 109510339 | A | 3/2019 |
| CN | 109802549 | A | 5/2019 |
| CN | 110518724 | A | 11/2019 |
| CN | 111130290 | A | 5/2020 |
| CN | 111934450 | A | 11/2020 |
| JP | 2005042632 | * | 2/2005 |
| JP | 2005042632 | A | 2/2005 |
| JP | 2018183021 | A | 11/2018 |
| WO | 2016/182600 | A1 | 12/2015 |

OTHER PUBLICATIONS

Li, Z., et al., "The Principle of the power magnetic bearing", Modern Manufacturing Engineering, Fund Project of Jiangsu Provincial Education Commission, Apr. 18, 2002, 3 pages. (with English abstract).

Extended European Search Report mailed Jan. 29, 2024, issued in corresponding European Application No. 21859687.2, filed Nov. 5, 2021, 8 pages.

* cited by examiner

RADIAL STATOR, MAGNETIC LEVITATION BEARING, INSTALLATION METHOD, AND MOTOR

CROSS-REFERENCE TO RELATED APPLICATION

The present application is a U.S. National Stage of International Application No. PCT/CN2021/093051, filed on May 11, 2021, which claims the priority of the Chinese patent application No. 202010876118.6, filed with China National Intellectual Property Administration on Aug. 26, 2020 and entitled "RADIAL STATOR, MAGNETIC LEVITATION BEARING, INSTALLATION METHOD, AND MOTOR", the entire contents of which [[is]] are incorporated herein by reference.

TECHNICAL FIELD

The present disclosure relates to the technical field of magnetic levitation bearings, and in particular, to a radial stator, a magnetic levitation bearing, an installation method, and a motor.

BACKGROUND

Magnetic levitation bearings have the characteristics of no mechanical contact, no need of lubrication, high critical speed, long service life, and high reliability, and are widely used in high-speed and ultra-high-speed fields.

When the magnetic levitation bearing is powered on, it easily generates heat. If the bearing temperature is too high, it will affect the stable operation of the bearing and the magnetic levitation system. On the other hand, the response speed of the bearing coil is also a key factor for the stable operation of the magnetic levitation bearing system.

The related radial magnetic levitation bearing generally adopts symmetrically arranged windings, and has a general structure including a main shaft, a radial displacement sensor, a first radial control coil, a first radial magnetic pole, a first radial stator, and a first rotor.

The rotor is sleeved on the main shaft, and the radial stator is sleeved on the outer ring of the rotor correspondingly in a circumferential direction, and six radial magnetic poles are evenly arranged on the inner circle of the radial stator. The radial magnetic poles each are provided with the same radial control coil. A radial displacement sensor is arranged on a side surface of the radial bearing.

Generally, the radial electromagnetic coil provides an attraction force to the rotor. The attraction force is mainly divided into two parts. One part is a bias electromagnetic force, which is used to balance the gravity of the main shaft, the eccentric magnetic pulling force and other stable forces exerted on the main shaft. The other part is a control electromagnetic force, which is used to balance the aerodynamic force exerted on the main shaft during rotation. The gravity of the main shaft is balanced by the upper-half windings of the radial bearing. When a radial displacement of the main shaft occurs, the sensor converts a detected displacement change into a signal and transmits the signal to the system, thus controlling the output force of the radial bearing to force the main shaft to return to the center position.

This structure has the following disadvantages:

The windings on the upper and lower magnetic poles of the radial bearing are consistent. The gravity of the main shaft is balanced by the upper-half windings. The lower-half windings have some redundant coils, the coil inductance is large, the response speed is slow, and the coil generates a large amount of heat.

SUMMARY

In view of this, the present disclosure provides a radial stator, a magnetic levitation bearing, an installation method, and a motor, which are used to solve at least the problems that in the related art, the lower-half windings have some redundant coils, the coil inductance is large, the response speed is slow, and the coil generates a large amount of heat.

In a first aspect, the present disclosure provides a radial stator, including a stator core.

The stator core includes a stator outer ring, M magnetic poles are arranged on an inner circumferential wall of the stator outer ring, and are evenly distributed along the inner circumferential wall of the stator outer ring.

The M magnetic poles comprise $M_1$ magnetic poles arranged along the inner circumferential wall of the stator outer ring and $M_2$ magnetic poles arranged along the inner circumferential wall of the stator outer ring; and $M \geq 2$, $M_1 \geq 1$, and $M_2 \geq 1$.

The $M_1$ magnetic poles and the $M_2$ magnetic poles are arranged on two sides of the stator outer ring with respect to a radial direction thereof, respectively.

Each of the $M_1$ magnetic poles is provided with a first winding; and each of the $M_2$ magnetic poles is provided with a second winding.

A coil turn $N_1$ of the first winding is greater or less than a coil turn $N_2$ of the second winding.

In some embodiments, numbers of the magnetic poles satisfy $M_1 = M_2$, and the $M_1$ magnetic poles and the $M_2$ magnetic poles are symmetrically distributed with respect to the radial direction of the stator outer ring.

In some embodiments, the numbers of the magnetic poles satisfy $M = M_1 + M_2$.

In some embodiment, in an installed state, the $M_1$ magnetic poles are disposed above the $M_2$ magnetic poles when a coil turn $N_1$ of the first winding is greater than a coil turn $N_2$ of the second winding.

The $M_2$ magnetic poles are disposed above the $M_1$ magnetic poles when the coil turn $N_1$ of the first winding is less than the coil turn $N_2$ of the second winding.

In some embodiments, when the coil turn $N_1$ of the first winding is greater than the coil turn $N_2$ of the second winding, a following relationship is satisfied:

$$\frac{N_1}{N_2} = \sqrt{\frac{a+1}{a}}$$

When the coil turn $N_1$ of the first winding is less than the coil turn $N_2$ of the second winding, a following relationship is satisfied:

$$\frac{N_1}{N_2} = \sqrt{\frac{a}{a+1}}$$

A range of a is: $0.1 < \alpha < 10$.

In some embodiments, an indicating mark is made on the radial stator to indicate up and down positions of the magnetic poles during an installation of the radial stator.

In a second aspect, the present disclosure provides a magnetic levitation bearing, including: the radial stator above and a rotor. The radial stator is sleeved on the rotor.

In some embodiment, in an installed state, the $M_1$ magnetic poles are disposed above the $M_2$ magnetic poles when a coil turn $N_1$ of the first winding is greater than a coil turn $N_2$ of the second winding.

The $M_2$ magnetic poles are disposed above the $M_1$ magnetic poles when the coil turn $N_1$ of the first winding is less than the coil turn $N_2$ of the second winding.

In a third aspect, the present disclosure provides an installation method for the magnetic levitation bearing above, including: confirming upper magnetic poles and lower magnetic poles, and locating the upper magnetic poles above the lower magnetic poles for installation.

In a fourth aspect, a motor, which includes the magnetic levitation bearing above, is provided.

In the present disclosure, by arranging windings with different coil turns, the asymmetrical winding structure is formed on the multiple magnetic poles of the stator core, thereby reducing the inductances of some windings, improving the response speed of the coil, reducing the resistances of some windings, and reducing the heat generated by the coil.

BRIEF DESCRIPTION OF THE DRAWINGS

The above and other objectives, features and advantages of the present disclosure will become more obvious by describing the exemplary embodiments in detail combining with the accompanying drawings. The drawings described hereinafter are simply some embodiments of the present disclosure, and for those of ordinary skill in the art, other drawings may also be obtained according to these drawings without creative efforts.

Figure 1:
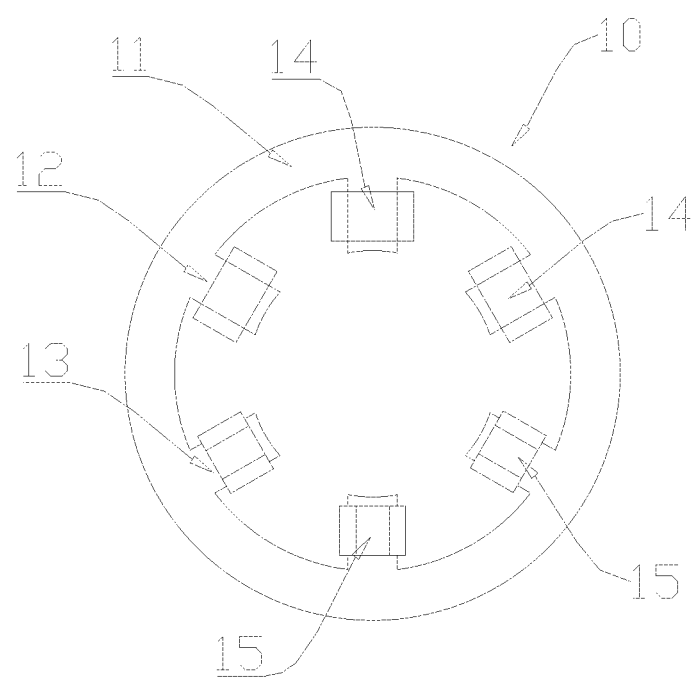
FIG. 1 shows a schematic structural view of a radial stator according to an embodiment of the present disclosure.

IN THE DRAWINGS 10. radial stator; 11. stator outer ring; 12. upper magnetic pole; 13. lower magnetic pole; 14. upper winding; 15. lower winding; 20. rotor.

DETAILED DESCRIPTION OF THE EMBODIMENTS

In order to make the objectives, technical solutions and advantages of the embodiments of the present disclosure clearer, the technical solutions of the embodiments of the present disclosure will be described clearly and completely hereinafter combining with the accompanying drawings of the embodiments of the present disclosure. Obviously, the described embodiments are some but not all embodiments of the present disclosure. Based on the embodiments in the present disclosure, all other embodiments obtained by those of ordinary skill in the art without creative efforts shall fall within the protection scope of the present disclosure.

The terms used in the embodiments of the present disclosure are for the purpose of describing particular embodiments only, but not intended to limit the present disclosure.

As used in the embodiments of the present disclosure and the appended claims, the singular forms "a", "the" and "this" are intended to include the plural forms as well. Unless the context clearly dictates, otherwise, the term "a plurality of" generally means that at least two objects are included, but the case of including at least one object is not excluded.

It should be understood that the term "and/or" used in the present disclosure is only used to describe an association relationship of the associated objects, and indicates that there may be three kinds of relationships, for example, A and/or B may indicate that A exists alone, and that A and B exist at the same time, and that B exists alone. In addition, the character "/" in the present disclosure generally indicates that there is an "or" relationship between the related front and back objects.

It should also be noted that the terms "comprise", "contain" or any other variation thereof are intended to encompass non-exclusive inclusion, such that a commodity or system comprising a series of elements comprises not only these elements, but also comprises other elements not listed explicitly or elements inherent to the commodity or system. Without further limitation, an element limited to be comprised via the phrase "comprise a . . . " does not exclude the presence of additional identical elements in the commodity or system that comprises the element.

In the present disclosure, by arranging windings with different coil turns, an asymmetrical winding structure is formed on the multiple magnetic poles of the stator core, thereby reducing the inductances of some windings, improving the response speed of the coil, reducing resistances of some windings, reducing the heat generated by the coil, and further reducing the coil turns of some windings and reducing the production cost. The present disclosure will be described in detail hereinafter combining with specific embodiments.

The present disclosure provides a radial stator, including a stator core. The stator core includes a stator outer ring. M magnetic poles are arranged on an inner circumferential wall of the stator outer ring and evenly distributed along the inner circumferential wall of the stator outer ring. The M magnetic poles include $M_1$ magnetic poles arranged along the inner circumferential wall of the stator outer ring and $M_2$ magnetic poles arranged along the inner circumferential wall of the stator outer ring. The $M_1$ magnetic poles are arranged continuously and the $M_2$ magnetic poles are arranged continuously, that is, the M magnetic poles include the continuously arranged $M_1$ magnetic poles and the continuously arranged $M_2$ magnetic poles, where $M \geq 2$, $M_1 \geq 1$, and $M_2 \geq 1$. The $M_1$ magnetic poles and the $M_2$ magnetic poles are arranged on two sides of the stator outer ring with respect to a radial direction thereof, respectively. Each of the $M_1$ magnetic poles is provided with a first winding, and each of the $M_2$ magnetic poles is provided with a second winding. That is, among the M magnetic poles, at least one magnetic pole is provided with the first winding, and at least one magnetic pole is provided with the second winding. The coil turn $N_1$ of the first winding is greater or less than the coil turn $N_2$ of the second winding, that is, the coil turns of the first winding and the second winding are different.

In some embodiments, $M_1 = M_2$, that is, the number of the magnetic poles provided with the first windings is the same as the number of the magnetic poles provided with the second windings. In some embodiments, the $M_1$ magnetic poles and the $M_2$ magnetic poles are arranged on the two sides of the stator outer ring with respect to the radial direction thereof, respectively, and are symmetrically distributed with respect to the radial direction of the stator outer ring.

In this embodiment, $M=M_1+M_2$. That is, among the M magnetic poles, some magnetic poles are provided with the first windings, and the other magnetic poles are provided with the second windings.

In an installation state of the radial stator, if the coil turn $N_1$ of the first winding is greater than the coil turn $N_2$ of the second winding, then the $M_1$ magnetic poles are disposed above the $M_2$ magnetic poles. If the coil turn $N_1$ of the first winding is less than the coil turn $N_2$ of the second winding, the $M_2$ magnetic poles are disposed above the $M_1$ magnetic poles. That is, the magnetic poles, which are provided with the windings with more coil turns, are arranged at upper positions; and the magnetic poles, which are provided with the windings with fewer coil turns, are arranged at lower positions, thereby avoiding redundant coils, reducing the coil inductance, improving the response speed, reducing the heat generated by the coil, and making the performance of the magnetic levitation bearing better.

As shown in FIG. 1, in a specific embodiment, the $M_1$ magnetic poles are defined as upper magnetic poles 12, and the $M_2$ magnetic poles are defined as lower magnetic poles 13. In the installation state, the upper magnetic poles 12 are located above the lower magnetic poles 13, and the upper magnetic poles 12 and the lower magnetic poles 13 are all arranged along the stator outer ring 11 and radially extend inwards. In some embodiments, the upper magnetic poles 12, the lower magnetic poles 13, and the radial stator outer ring 11 are constructed as a unitary structure, for example, they may be formed by laminations of silicon steel sheets.

In some embodiments, the number of the upper magnetic poles 12 is identical with the number of the lower magnetic poles 13, and the upper magnetic poles 12 and the lower magnetic poles 13 are symmetrically distributed with respect to a diameter of the stator outer ring 11. In this embodiment, three upper magnetic poles 12 and three lower magnetic poles 13 are arranged, and an interval between any two adjacent magnetic poles is the same.

In this embodiment, the first winding is defined as an upper winding 14, the second winding is defined as a lower winding 15, and the coil turn of the upper winding 14 is greater than the coil turn of the lower winding 15.

The upper winding 14 is arranged on the upper magnetic pole 12, the lower winding 15 is arranged on the lower magnetic pole 13, and the upper winding 14 and the lower winding 15 are wound on the magnetic poles clockwise or anticlockwise, respectively.

In some embodiments, when the coil turn of the upper winding 14 is $N_1$, and the coil turn of the lower winding 15 is $N_2$, then $$\frac{N_1}{N_2} = \sqrt{\frac{a+1}{a}}$$

A range of α is 0.1<α<10. Or, when the coil turn of the upper winding 14 is $N_2$, the coil turn of the lower winding 15 is $N_1$, then $$\frac{N_1}{N_2} = \sqrt{\frac{a}{a+1}}$$

The range of α is 0.1<α<10.

Figure 2:
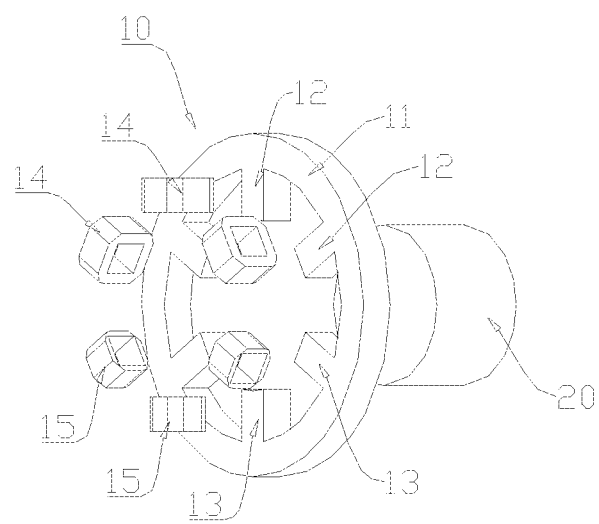
FIG. 2 shows a schematic exploded structure view of a magnetic levitation bearing according to an embodiment of the present disclosure.
Figure 3:
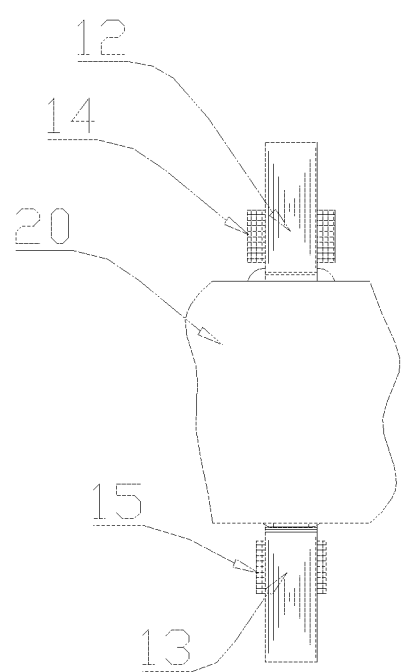
FIG. 3 shows a schematic sectional view of the magnetic levitation bearing according to an embodiment of the present disclosure.

The present disclosure also provides a magnetic levitation bearing. As shown in FIG. 2 and FIG. 3, the magnetic levitation bearing includes the radial stator 10 above and a rotor 20. The radial stator 10 is sleeved on the rotor 20, and a gap is formed between the rotor 20 and an end of each magnetic pole of the radial stator 10. The upper winding 14 and the lower winding 15 are wound on the magnetic poles clockwise or anticlockwise, respectively. The upper magnetic poles 12 are located on an upper side of the rotor 20, and the lower magnetic poles 13 are located on a lower side of the rotor 20. A magnetic path is formed between the upper windings 14 to generate an upward resultant magnetic force, and a magnetic path is formed between the lower windings 15 to generate a downward resultant magnetic force.

In the magnetic levitation bearing system, the forces exerted on the rotor 20 in operation mainly include its own gravity, a magnetic pulling force, and a centrifugal force for rotation. In the embodiment of the magnetic levitation bearing, the upper windings 14 need to balance the gravity of the rotor 20, the magnetic pulling force and the centrifugal force, and the lower windings 15 need to balance the magnetic pulling force and the centrifugal force. Let the gravity of the rotor 20 be $F_1=mg$, and the resultant force of the magnetic pulling force and the centrifugal force be $F_2=\alpha F_1$, where a denotes a ratio of the resultant force of the magnetic pulling force and the centrifugal force exerted on the rotor to the gravity of the rotor, and is affected by motor dimensions and a rotation speed. The motor dimensions remain unchanged, and the rotation speed increases, then the value of a increases. The motor dimensions increase, the rotation speed remains unchanged, then the value of a decreases. Then the force needed to be provided by the upper windings 14 is $F_1+F_2=(\alpha+1)$ mg, and the force needed to be provided by the lower windings 15 is $F_2=\alpha$ F=α mg. According to a calculation formula of the electromagnetic force, the square of the coil turn of the winding is directly proportional to the electromagnetic force, so the relationship between the coil turn $N_1$ of the upper winding 14 and the coil turn $N_2$ of the lower winding 15 is:

$$\frac{N_1}{N_2} = \sqrt{\frac{a+1}{a}}$$

In some embodiments, the magnetic levitation bearing is an active magnetic levitation bearing, and the range of α is set to be 0.1<α<10, and the relationship between the coil turn of the upper winding 14 and the coil turn of the lower winding 15 is:

$$\sqrt{\frac{11}{10}} < \frac{N_1}{N_2} < \sqrt{11}$$

In some embodiments, a space-filling factor of the radial magnetic levitation bearing is in an allowable range of 0.5 to 0.8.

In some embodiments, each of the upper windings 14 and each of the lower windings 15 may be controlled independently, and each winding may be controlled according to the state of the rotor 20. For example, when the position of the rotor 20 is centered, the forces provided by different windings are the same. If the rotor 20 deviates from the center to the upper left corner, the output force of the upper winding 14 at the upper left corner decreases, and the output force of the lower winding 15 at the lower right corner increases. If the rotor 20 deviates from the center to the upper right corner, the output force of the upper winding 14 at the upper right corner decreases, and the output force of the lower winding 15 at the lower left corner increases, etc., so as to balance the forces exerted on the rotor 20 and ensure that the air gaps between the rotor 20 and the magnetic poles are the same during operation of the rotor.

After all windings are powered on, part of the electromagnetic force generated by the upper winding 14 is configured to balance the gravity of the rotor 20 itself. During the rotation, the rotor 20 may be subjected to a disturbance force and a centrifugal force generated due to a disequilibrium of the rotor 20 itself, the redundant electromagnetic force generated by the upper winding 14 and the electromagnetic force generated by the lower winding 15 are configured to balance these external forces exerted on the rotor 20, so that the rotor 20 may reach a stable operation state.

In some embodiments, in order to facilitate the installation and make the installation more convenient, an indicating mark may be made on the magnetic levitation bearing. In some embodiments, the indicating mark may be made on an axial end surface of the stator outer ring 11. In some embodiments, indicating marks may be made on two end surfaces, so that the installation of the magnetic levitation bearing becomes more convenient. For example, the mark may be made on the stator outer ring 11, and the mark is made on the part where the upper magnetic poles 12 are arranged. For example, a word "up" may be marked, or a symbol, such as an arrow, may be marked.

The present disclosure also provides an installation method of a magnetic levitation bearing, which is configured for installing the magnetic levitation bearing above. During an installation, positions of the upper winding 14 and the lower winding 15 are first confirmed, and the upper winding 14 is ensured to be positioned at the upper side during the installation process.

The present disclosure also provides a motor, including the magnetic levitation bearing above, and is installed by using the installation method above. In some embodiments, the motor provided by the present disclosure is applicable to an equipment such as a compressor, to improve performance of the whole machine and reduce energy consumption.

In the present disclosure, the asymmetrical winding structure is arranged, that is, the coil turns of the upper windings and the lower windings are different, thereby avoid redundant coils, reducing the inductance of the coil, improving the response speed, reducing the heat generated by the coil, and making the performance of the magnetic levitation bearing better.

What illustrated and described are exemplary embodiments of the present disclosure. It should be understood that the present disclosure is not limited to the structure, the arrangements, or the implementations described in detail herein. On the contrary, the present disclosure is intended to cover various modifications and equivalent arrangements included within the spirits and scope of the appended claims.

What is claimed is:

1. A radial stator, comprising a stator core, wherein:
the stator core comprises a stator outer ring; M magnetic poles are arranged on an inner circumferential wall of the stator outer ring, and are evenly distributed along the inner circumferential wall of the stator outer ring; the M magnetic poles comprise $M_1$ magnetic poles arranged along the inner circumferential wall of the stator outer ring and $M_2$ magnetic poles arranged along the inner circumferential wall of the stator outer ring; $M \geq 2$, $M_1 \geq 1$, and $M_2 \geq 1$;

the $M_1$ magnetic poles and the $M_2$ magnetic poles are arranged on two sides of the stator outer ring with respect to a radial direction thereof, respectively;

each of the $M_1$ magnetic poles is provided with a first winding; and each of the $M_2$ magnetic poles is provided with a second winding;

a coil turn $N_1$ of the first winding is greater or less than a coil turn $N_2$ of the second winding;

in an installed state:
the $M_1$ magnetic poles are disposed above the $M_2$ magnetic poles, and a coil turn $N_1$ of the first winding is greater than a coil turn $N_2$ of the second winding; and a following relationship is satisfied:

$$\frac{N_1}{N_2} = \sqrt{\frac{a+1}{a}}$$

wherein a range of $\alpha$ is: $0.1 < \alpha < 10$.

2. The radial stator according to claim 1, wherein numbers of the magnetic poles satisfy $M_1 = M_2$, and the $M_1$ magnetic poles and the $M_2$ magnetic poles are symmetrically distributed with respect to the radial direction of the stator outer ring.

3. The radial stator according to claim 2, wherein the numbers of the magnetic poles satisfy $M = M_1 + M_2$.

4. The radial stator according to claim 1, wherein an indicating mark is made on the radial stator to indicate up and down positions of the magnetic poles during an installation of the radial stator.

5. A magnetic levitation bearing, comprising the radial stator of claim 1, and a rotor, wherein the radial stator is sleeved on the rotor.

6. An installation method for the magnetic levitation bearing of claim 5, comprising:
confirming upper magnetic poles and lower magnetic poles; and
locating the upper magnetic poles above the lower magnetic poles for installation.

7. A motor, comprising the magnetic levitation bearing of claim 5.

8. A radial stator, comprising a stator core, wherein:
the stator core comprises a stator outer ring; M magnetic poles are arranged on an inner circumferential wall of the stator outer ring, and are evenly distributed along the inner circumferential wall of the stator outer ring; the M magnetic poles comprise $M_1$ magnetic poles arranged along the inner circumferential wall of the stator outer ring and $M_2$ magnetic poles arranged along the inner circumferential wall of the stator outer ring; $M \geq 2$, $M_1 \geq 1$, and $M_2 \leq 1$;

the $M_1$ magnetic poles and the $M_2$ magnetic poles are arranged on two sides of the stator outer ring with respect to a radial direction thereof, respectively;

each of the $M_1$ magnetic poles is provided with a first winding; and each of the $M_2$ magnetic poles is provided with a second winding;

a coil turn $N_1$ of the first winding is greater or less than a coil turn $N_2$ of the second winding;

in an installed state:

the $M_2$ magnetic poles are disposed above the $M_1$ magnetic poles, and the coil turn $N_1$ of the first winding is less than the coil turn $N_2$ of the second winding; and a following relationship is satisfied:

$$\frac{N_1}{N_2} = \sqrt{\frac{a}{a+1}};$$

wherein a range of $\alpha$ is: $0.1 < \alpha < 10$.

* * * * *